US012670479B2

(12) United States Patent
Vukich

(10) Patent No.: US 12,670,479 B2
(45) Date of Patent: *Jun. 30, 2026

(54) COMPUTER-BASED SYSTEMS CONFIGURED FOR AUTOMATED ELECTRONIC CALENDAR MANAGEMENT AND WORK TASK SCHEDULING AND METHODS OF USE THEREOF

(71) Applicant: Capital One Services, LLC, McLean, VA (US)

(72) Inventor: Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/662,455

(22) Filed: May 13, 2024

(65) Prior Publication Data

US 2024/0296427 A1 Sep. 5, 2024

Related U.S. Application Data

(63) Continuation of application No. 18/175,310, filed on Feb. 27, 2023, now Pat. No. 11,983,677, which is a (Continued)

(51) Int. Cl.
*G06Q 10/1093* (2023.01)
*G06N 20/00* (2019.01)
*G06Q 10/109* (2023.01)

(52) U.S. Cl.
CPC ......... *G06Q 10/1093* (2013.01); *G06N 20/00* (2019.01); *G06Q 10/1097* (2013.01)

(58) Field of Classification Search
None
See application file for complete search history.

(56) References Cited

U.S. PATENT DOCUMENTS

| | | | |
|---|---|---|---|
| 2004/0003042 A1* | 1/2004 | Horvitz | G06Q 10/109 709/204 |
| 2014/0304023 A1* | 10/2014 | Li | G06Q 10/1097 705/7.21 |
| 2017/0193349 A1* | 7/2017 | Jothilingam | G06N 20/20 |

FOREIGN PATENT DOCUMENTS

CN 108475365 A 8/2018

OTHER PUBLICATIONS

Hossain et al (S. M. M. Hossain and E. M. Shakshuki, "A Deliberative Agent for Meeting Scheduling," 2013 IEEE 27th International Conference on Advanced Information Networking and Applications (AINA), Barcelona, Spain, 2013, pp. 732-739, doi: 10.1109/ AINA.2013.87) (Year: 2013).*

(Continued)

*Primary Examiner* — Mehmet Yesildag
(74) *Attorney, Agent, or Firm* — GREENBERG TRAURIG, LLP

(57) ABSTRACT

In order to facilitate automated electronic calendar task management with automatic task scheduling, systems and methods are described including receiving and electronic meeting request to schedule a meeting. Work task data items identifying work tasks associated with the attendees are determined. A task estimation machine learning model predicts work parameters of meeting task objects based on the work task data items, and a work history data identifying work history of each attendee. A meeting scheduling machine learning model predicts parameters of unavailability period objects representing unavailability periods required to complete the work tasks based on the meeting task object, schedule information and location information. An indication of the at least one unavailability period is displayed on a screen of a computing device associated with each attendee. Selections of the unavailability period is (Continued)

received from the attendees, and the unavailability period is dynamically secured prior to the meeting.

20 Claims, 8 Drawing Sheets

Related U.S. Application Data continuation of application No. 17/242,767, filed on Apr. 28, 2021, now Pat. No. 11,593,766, which is a continuation of application No. 16/731,332, filed on Dec. 31, 2019, now Pat. No. 11,049,077.

(56) References Cited

OTHER PUBLICATIONS

Kim et al (Donghyeon Kim, Jinhyuk Lee, Donghee Choi, Jaehoon Choi, Jaewoo Kang, "Learning User Preferences and Understanding Calendar Contexts for Event Scheduling", https://doi.org/10.48550/arXiv.1809.01316, 2018) (Year: 2018).*

Cranshaw et al., "Calendar.help: Designing a Workflow-Based Scheduling Agent with Humans in the Loop" arXiv:1703.08428, Mar. 24, 2017 (Year: 2017).

Hossain et al., "A Deliberative Agent for Meeting Scheduling," 2013 IEEE 27th International Conference on Advanced Information Networking and Applications (AINA), Barcelona, Spain, 2013, pp. 732-739, doi: 10.1109/AI NA.2013.87. ( Year: 2013).

Kim et al., "Learning User Preferences and Understanding Calendar Contexts for Event Scheduling", https://doi.org/10.48550/arXiv. 1809.01316, 2018 (Year: 2018).

* cited by examiner

COMPUTER-BASED SYSTEMS CONFIGURED FOR AUTOMATED ELECTRONIC CALENDAR MANAGEMENT AND WORK TASK SCHEDULING AND METHODS OF USE THEREOF

COPYRIGHT NOTICE

FIELD OF TECHNOLOGY

The present disclosure generally relates to improved computer-based platforms/systems, improved computing devices/components and/or improved computing objects configured for one or more novel technological applications of automated electronic calendar management and work task scheduling and methods of use thereof.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs), among a wide range of users.

SUMMARY OF DESCRIBED SUBJECT MATTER

In some embodiments, the present disclosure provides an exemplary technically improved computer-based method that includes at least the following steps of receiving, by at least one processor, a plurality of electronic meeting requests to schedule a meeting; where each electronic meeting request includes an attendee data item identifying at least one respective attendee of each respective meeting. A plurality of work task data items are determined identifying a respective plurality of work tasks associated with the at least one respective attendee; where the plurality of work task data items is stored in at least one task database. A task estimation machine learning model is utilized to predict a plurality of work parameters of at least one meeting task object based at least in part on: i) the plurality of work task data items, and ii) a work history data identifying work history of the at least one respective attendee; where the at least one meeting task object represents at least one respective work task that the at least one respective attendee would be required to complete prior to the respective meeting; where the plurality of work parameters includes a task duration parameter representing a predicted time that the at least one respective attendee requires to complete the at least one respective work task associated with each respective meeting; where the work history data includes: i) prior work task data items identifying at least one completed respective work task by the at least one respective attendee, and ii) prior task duration data items identifying a time that took the at least one respective attendee to complete the at least one completed respective work task. A meeting scheduling machine learning model is utilized to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request; where the plurality of parameters of at least one meeting room object includes: i) an unavailability period location parameter, and ii) an unavailability period time parameter; where the schedule information includes: i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room. An indication of the at least one unavailability period is caused to display in response to the at least one electronic meeting request on a screen of at least one computing device associated with the at least one respective attendee based at least in part on the plurality of predicted parameters of the at least one unavailability period object representing the at least one respective unavailability period. A selection of the at least one respective unavailability period is received from the at least one respective attendee, and the at least one respective unavailability period is dynamically secured prior to the at least one respective meeting.

In some embodiments, the present disclosure provides an exemplary technically improved computer-based method that includes at least the following steps of receiving, by at least one processor, at least one respective work task modification indication representative of completion of at least one respective work task associated with at least one respective meeting; where at least one respective work task modification indication includes: i) an attendee data identifying at least one respective attendee of the at least one respective meeting, and ii) a modification to a respective unavailability period time parameter. An error in a plurality of work parameters of at least one meeting task object predicted by a task estimation machine learning model is determined based at least in part on a difference between at the at least one respective work task modification indication and respective work parameters; where the at least one meeting task object represents at least one respective work task that the at least one respective attendee would be required to complete prior to respective meeting. The task estimation machine learning model is trained based at least in part on the error of a plurality of the respective work parameters. A plurality of work task data items are determined identifying a respective plurality of work tasks associated with the at least one respective attendee; where the plurality of work task data items is stored in at least one task database. The task estimation machine learning model is utilized to predict a plurality of new work parameters of at least one meeting task object based at least in part on: i) the plurality of work task data items, and ii) a work history data identifying work history of the at least one respective attendee; where the plurality of work parameters includes a task duration parameter representing a predicted time that the at least one respective attendee requires to complete the at least one respective work task associated with each respective meeting; where the work history data includes: i) work task data items identifying at least one completed respective work task by the at least one respective attendee, and ii) prior task duration data items identifying a time that took the at least one respective attendee to complete the at least one completed respective work task. A meeting scheduling machine learning model is utilized to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request; where the plurality of parameters of at least one meeting room object includes: i) a new unavailability period location parameter, and ii) a new unavailability period time parameter; where the schedule information includes: i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee; where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room. An indication of the at least one unavailability period is caused to display in response to the at least one electronic meeting request on a screen of at least one computing device associated with the at least one respective attendee based at least in part on the plurality of predicted parameters of the at least one unavailability period object representing the at least one respective unavailability period. A selection of the at least one respective unavailability period is received from the at least one respective attendee, and the at least one respective unavailability period is dynamically secured prior to the at least one respective meeting.

In some embodiments, the present disclosure provides an exemplary technically improved computer-based system that includes at least the following components of at least one processor. The at least one processor is configured to: receive a plurality of electronic meeting requests to schedule a meeting; where each electronic meeting request includes an attendee data item identifying at least one respective attendee of each respective meeting; determine a plurality of work task data items identifying a respective plurality of work tasks associated with the at least one respective attendee; where the plurality of work task data items is stored in at least one task database; utilize a task estimation machine learning model to predict a plurality of work parameters of at least one meeting task object based at least in part on: i) the plurality of work task data items, and ii) a work history data identifying work history of the at least one respective attendee; where the at least one meeting task object represents at least one respective work task that the at least one respective attendee would be required to complete prior to the respective meeting; where the plurality of work parameters includes a task duration parameter representing a predicted time that the at least one respective attendee requires to complete the at least one respective work task associated with each respective meeting; where the work history data includes: i) prior work task data items identifying at least one completed respective work task by the at least one respective attendee, and ii) prior task duration data items identifying a time that took the at least one respective attendee to complete the at least one completed respective work task; utilize a meeting scheduling machine learning model to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request; where the plurality of parameters of at least one meeting room object includes: i) an unavailability period location parameter, and ii) an unavailability period time parameter; where the schedule information includes: i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, where the meeting history data includes: 1) cancellation data identifying meeting cancellations, and 2) rescheduling data identifying meeting rescheduling occurrences; where the location information includes: i) an attendee location data identifying at least one respective location associated with the at least one respective attendee, ii) available meeting room data identifying all available meeting rooms, and iii) a meeting room location associated with each available meeting room; cause to display an indication of the at least one unavailability period in response to the at least one electronic meeting request on a screen of at least one computing device associated with the at least one respective attendee based at least in part on the plurality of predicted parameters of the at least one unavailability period object representing the at least one respective unavailability period; receive a selection of the at least one respective unavailability period from the at least one respective attendee; and dynamically secure the at least one respective unavailability period prior to the at least one respective meeting.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
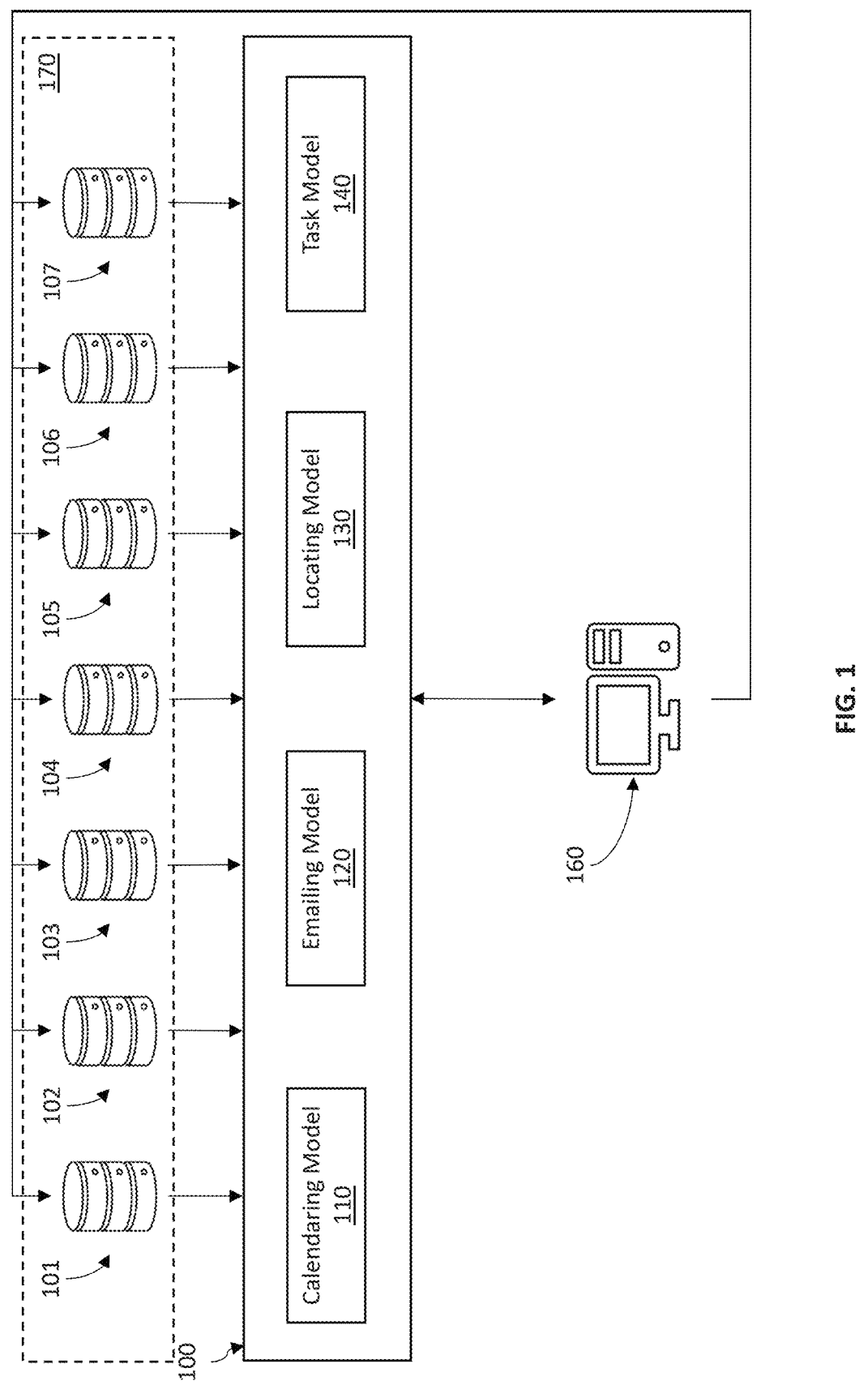
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device, mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35).NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/ public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 through 8 illustrate systems and methods of meeting rescheduling predictions using machine learning techniques and database intercommunication. The following embodiments provide technical solutions and/or technical improvements that overcome technical problems, drawbacks and/or deficiencies in the technical fields involving machine learning, database technologies, networking technologies, dynamic resource management, message coordination, among others. As explained in more detail, below, technical solutions and/or technical improvements herein include aspects of improved database communication and record keeping, dynamic resource management, and machine learning. Based on such technical features, further technical benefits become available to users and operators of these systems and methods. Moreover, various practical applications of the disclosed technology are also described, which provide further practical benefits to users and operators that are also new and useful improvements in the art.

FIG. 1 depicts a diagram of an exemplary illustrative collaboration system according to an illustrative embodiment of the present invention.

In some embodiments, a collaboration system 100 access schedule and communication data associated with users to facilitate collaboration between and amongst the users by providing collaborative services and functions. In some embodiments, the collaboration services include predictions as to various collaborative interactions, such as, e.g., predicting optimum meeting schedules, email prioritization, task schedules and prioritization, among other collaboration services, and generating electronic calendar and electronic communication items, such as, electronic calendar meeting invites, electronically booking locations such as meeting rooms, and electronically ordering and prioritizing communication. In some embodiments, the collaboration system 100 may automatically convey the prediction to each user involved with the collaborative interaction at a respective user computing device 160.

In some embodiments, the user computing device 160 may include a personal computer, a mobile computing device such as a tablet or smartphone, among other computing devices. In some embodiments, there may be a plurality of user computing devices 160 in communication with the collaboration system 100, such as, e.g., between about 1 and about 10 computing devices, between about 1 and about 20 computing devices, between about 1 and about 100 computing devices, or any other number of computing devices for providing collaboration services to each user of, e.g., a set of customers, an organization such as a company, corporation, foundation, family, social club, school, university, government agency, or other organization, a set of organizations, or other group of users.

In some embodiments, the collaboration system 100 receives data from multiple data sources related to user schedules, relationships and communication to facilitate comprehensive and accurate prediction of collaboration characteristics for automatically initiating collaborative interactions. In some embodiments, the data may include, e.g., user calendar data, organizational personnel data, user location data, meeting room data, user email data, user task data, user work product data, among other task, communication and schedule data. Accordingly, in some embodiments, the collaboration system 100 receives the user calendar data, the organizational personnel data, the user location data, the meeting room data, the user email data, the user task data, and the user work product data from a calendar database 101, an organization database 102, a location database 103, a meeting room database 104, an email database 105, a task database 106, and a work product database 107, respectively.

In some embodiments, the calendar database 101 may include a virtual or electronic calendar associated with each user in communication with the collaboration system 100 via a respective user computing device 160. The virtual calendar may include scheduled meetings and appointments, out-of-office periods, scheduled vacations, working hours, among other calendar-related data of each user in communication with collaboration system 100. In some embodiments, the virtual calendar may include scheduling information such as, e.g., availability and meeting history (e.g., cancellations, scheduled meetings, relocated meeting, etc.) that are represented in a calendar program associated with each user. Examples of such calendar programs may include but are not limited to, e.g., Microsoft™ Outlook™, Google™ Calendar, Apple™ Calendar, IBM™ Notes, among other programs having virtual calendaring functions. Information entered into such programs may be stored in the calendar database 101 to aggregate scheduling information for use by the collaboration system 100.

In some embodiments, the organization database 102 may include a virtual organization chart or other representation of position hierarchy associated with each user in communication with the collaboration system 100 via a respective user computing device 160. The virtual organization chart may include a hierarchy of personnel in an organization and an organization structure, including, e.g., entry-level personnel up through senior management and executives.

In some embodiments, the location database 103 may include a representation of a location of each user in communication with the collaboration system 100 via a respective user computing device 160. The location may include, e.g., a latitude and longitude, a street address, a building identification, a room identification within a building, a floor within a building, among others and combinations thereof.

In some embodiments, the meeting room database 104 may include a list of possible meeting rooms and a representation of a location of each room listed as a possible meeting room. The location may include, e.g., a latitude and longitude, a street address, a building identification, a room identification within a building, a floor within a building, among others and combinations thereof.

In some embodiments, the email database 105 may include, e.g., an archive of sent and received emails associated with each user in communication with the collaboration system 100. In some embodiments, the emails may include, e.g., metadata, text, attachments, media, recipients, senders, carbon-copy (CC) recipients, among other data associated with each email. In some embodiments, the emails may be extracted or otherwise received from an email program and/or service associated with each user. Examples of such email programs and/or services may include but are not limited to, e.g., Microsoft™ Outlook™, Google™ Gmail™, Apple™ Mail, IBM™ Notes, among other email programs and services. Information entered into such programs may be stored in the calendar database 101 to aggregate scheduling information for use by the collaboration system 100.

In some embodiments, the task database 106 may include a history of work tasks assigned to each user. In some embodiments, the history may include, e.g., start dates, completion dates, start times, completion times, task subject, task project, collaborators and/or team-mates associated with each task, among other task related data. In some embodiments, the task database 106 may receive the task history from project management, task management and task tracking platforms and programs, such as, e.g., Jira™, Microsoft Dynamics™, NetSuite™, Launchpad™, among others and combinations thereof.

In some embodiments, the work product database 107 may include a history of work product produced by each user in communication with the collaboration system 100. In some embodiments, the work product may include completed projects, such as, e.g., papers, administrative documents, published documents, documents submitted to, e.g., supervisors and/or project management platforms as complete, source code, software releases, among other types of work product. The work product database 107 may include, e.g., a document repository, a document storage, a cloud storage platform, a server database, a distributed database, among others.

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the collaboration system 100 may include models for performing multiple collaborative services. In some embodiments, the collaboration system 100 includes a calendaring model 110 to, e.g., automatically schedule, reschedule and cancel meetings, appointments, out-of-office periods, unavailability periods, and other virtual calendar items associated with users based on data from one or more of the calendar database 101, the organization database 102, the location database 103, the meeting room database 104, the email database 105, the task database 106, and the work product database 107. In some embodiments, the calendaring model 110 may include, e.g., machine learning models, such as, e.g., one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

In some embodiments, the calendaring model 110 may, e.g., employ the AI/machine learning techniques to predict an optimum meeting between attendees based on, e.g., location data, meeting room data, and schedule information including, e.g., calendar data such as availability and meeting history (e.g., cancellations, rescheduling, etc.) among others. Based on such data received from, e.g., the calendar database 101, the location database 103, and the meeting room database 104, the machine learning model may predict a place and time that is least likely to be cancelled or rescheduled. In some embodiments, the machine learning model may incorporate organizational hierarchies from the organization database 102 to prioritize the schedule and location of attendees higher in the hierarchy.

In some embodiments, the calendaring model 110 may employ the machine learning model and/or AI/machine learning techniques as described above to, e.g., schedule meetings, schedule uninterrupted work time or unavailability periods, among other electronic calendar items. Such scheduled meetings may be scheduled automatically based on, e.g., location data, meeting room data, and schedule information including, e.g., calendar data such as availability and meeting history (e.g., cancellations, rescheduling, etc.) among others, from the location database 103, the meeting room database 104 and/or the calendar database 101.

In some embodiments, the collaboration system 100 includes an emailing model 120 to, e.g., determine an order of priority of received emails. In some embodiments, the collaboration system 100 may receive electronic messages, including emails, instant message communications, simple message service (SMS) messages, among other electronic message formats. In some embodiments, the emailing model 120 may receive and/or determine indicators of attributes of the electronic messages, such as, e.g., sender, recipient or recipients, carbon-copied (cc'd) recipients, subject line text, electronic message text, attached files and/or media, hyperlinks, urgency markers, read-receipts, associated conversations for each electronic message, related calendar events, such as a calendar event created with the electronic message or a calendar event for which the electronic message is a response, among other attributes. In some embodiments, the emailing model 120 may include, e.g., AI/machine learning techniques, such as those described above, to form parameters from one or more of the attributes, such as, e.g., subject line text, sender including data from the organization database 102, and related calendar events including calendar data from the calendar database 101 by correlating each of the attributes with a likelihood of the user viewing, responding to, forwarding, deleting, delaying, or otherwise interacting with the electronic message.

In some embodiments, using the parameters, the AI/machine learning techniques of the emailing model 120 may predict a level of priority of each electronic message. In some embodiments, the level of priority may be a priority scale, such as a numeric scale in a range of between about 1 and about 10, between about 1 and about 5, between about 1 and about 100, or other range. In some embodiments, the level of priority may include a relative level of priority, where the emailing model 120 ranks each electronic message according to a relative priority level compared to each other electronic message. Accordingly, in some embodiments, a user may be presented with a list of electronic messages in an order of priority such that the most important and/or actionable electronic messages may be presented first. In some embodiments, the collaboration system 100 includes a locating model 130 to, e.g., optimize a location of a meeting based on, e.g., location data from the location database 103 and meeting room data from the meeting room database 104. In some embodiments, the locating model 130 employs AI/machine learning techniques, such as those described above, to predict an optimum location for a meeting that will reduce the likelihood of the meeting being cancelled, rescheduled or relocated. In some embodiments, the optimum location depends on a location of each attendee to a meeting as well as a location of each available meeting room for the meeting. In some embodiments, the locating model 130 may also take into account meeting room resources, such as, e.g., video conferencing equipment, technology support, size, furniture, among other features of a meeting room. In some embodiments, the predicted optimum location can be provided to the calendar model 110, which may, in turn, automatically schedule a meeting using the predicted optimum meeting location.

In some embodiments, the collaboration system 100 includes a task model 140 to, e.g., automatically schedule calendar events to perform a task associated with one or more meetings based on, e.g., email data from the email database 105 associated with emails related to the meetings, task data from the task database 106 associated with current and past tasks of each attendee, and work product data from the work product database 107 associated with completed work product of each attendee. In some embodiments, the task model 140 interacts with the calendar model 110 to determine tasks associated with an upcoming meeting, a time to complete the tasks, and attendees associated with the task. To do so, in some embodiments, the task model 140 employs AI/machine learning techniques, such as those described above, to predict a task parameter leading up to the meeting. The task parameter can be used by the calendar model 110 to automatically determine a task time and location for the associated attendees to complete the task prior to the meeting. In an embodiment, the calendar model 110 may then automatically schedule the task time and location each attendee's respective calendar to facilitate private, uninterrupted work time.

Figure 2:
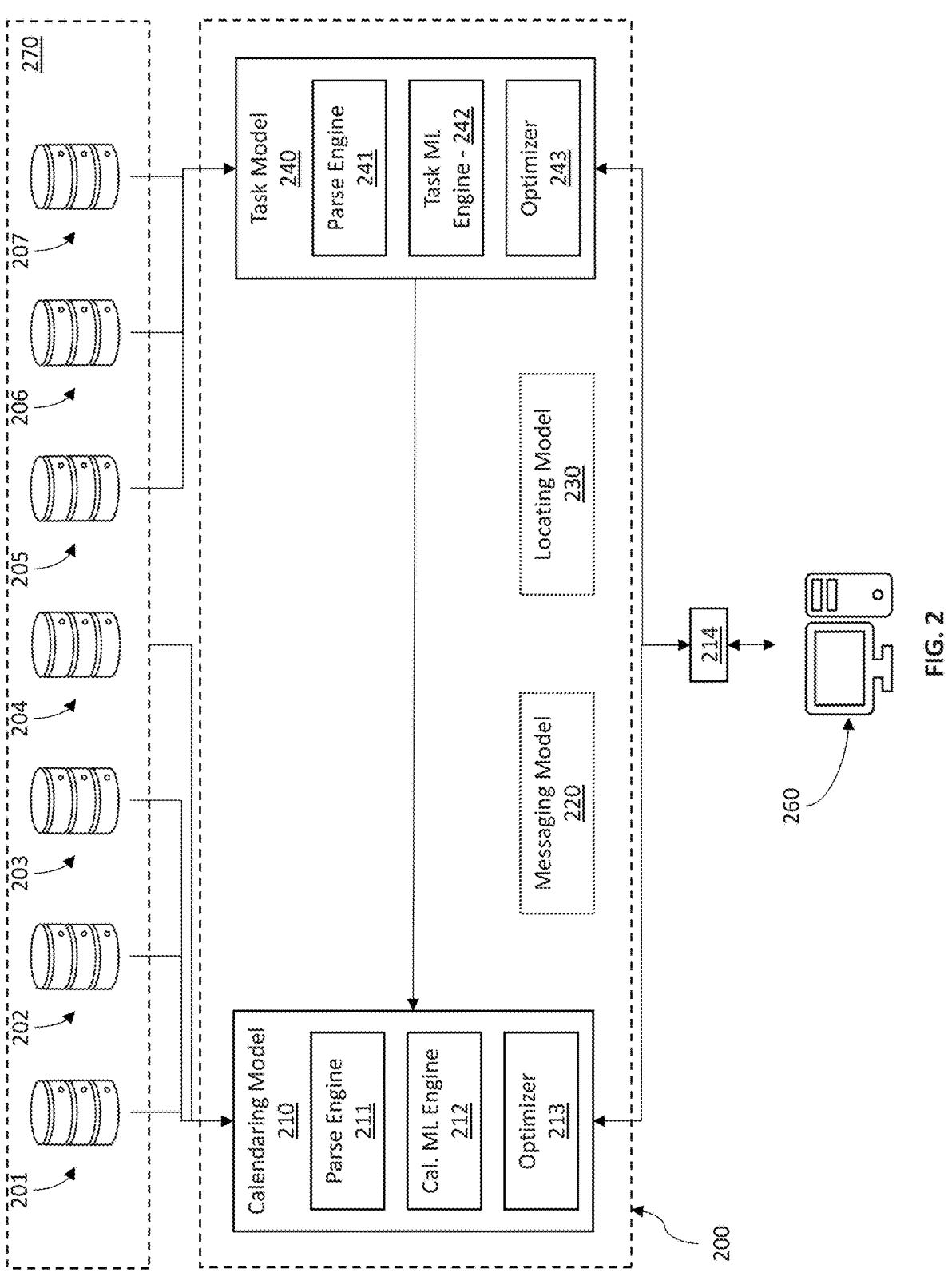

FIG. 2 depicts a diagram of a calendaring model for an exemplary illustrative automated calendar management system in accordance with an illustrative embodiment of the present invention.

In some embodiments, a collaboration system 200 includes a calendaring model 210 in communication with collaboration databases, such as, a calendar database 201, an organization database 202, a location database 203 and a meeting room database 204, among other suitable databases for providing information for calendar and meeting collaboration. In some embodiments, each of the collaboration databases may include data in a suitable format, such as, e.g., tables, text, tuples, arrays, etc. Each data item in the collaboration databases may also include metadata associated with information such as, e.g., origin of the data, destination, format, time and date, geographic location information, source identifier (ID), among other information.

In some embodiments, the calendaring model 210 may leverage the data in the collaboration databases, including associated metadata, to predict optimum meeting times and/or locations, such as optimum meeting times based on scheduling information related to attendees, optimum meeting locations based on location information associated with the attendees as well as available meeting rooms, and meeting room resources, optimum unavailability periods for attendees to prepare for meetings, among other functions. In some embodiments, a task model 240 may assist the calendaring model 210 in scheduling, e.g., unavailability time for attendees to complete tasks prior to a meeting. The task model 240 may include a task estimation machine learning model that predicts a duration that represents an estimated amount of time to complete a task that a particular attendee needs to perform prior to the meeting.

In some embodiments, the calendaring model 210 may predict the meeting times and/or locations and the preceding unavailability time in response to a user interaction 214 from a user computing device 260 and a predicted task duration predicted by the task model 240. In some embodiments, the user interaction 214 includes, e.g., an electronic calendar invite communicated as an electronic meeting request. In some embodiments, the electronic meeting request may include data pertaining to related work tasks and/or related projects to which the calendar invite is directed. In some embodiments, attendees or invitees to the meeting resulting from the calendar invite may need to complete the work tasks and/or projects prior to meeting in order to prepare for the meeting. For example, the electronic meeting request may include information related to a role that a particular attendee is scheduled to perform, such as, e.g., give a presentation, demonstrate a product and/or service, give feedback on a project, among other roles of the particular attendee. In some embodiments, multiple attendees may have roles assigned to them. In some embodiments, the roles, work tasks and/or projects are specified by, e.g., specially formatted tags such as hypertext markup language (HTML) tags, extensible markup language (XML) tags, JSON tags, or other tags. However, in some embodiments, the assigned roles, work tasks and/or projects may be found in a body of text in the electronic meeting request.

In some embodiments, the task model 240 may receive the electronic meeting request 214 and utilize a parse engine 241 to determine the work tasks and/or projects related to the meeting. The parse engine 241 may analyze, e.g., text, tags and/or other data included with the electronic meeting request 214 and recognize with, e.g., a machine learning model such as a classifier or other recognition algorithm, the work tasks that each attendee of the electronic meeting request 214 needs to complete. Based on the recognized work tasks, the parse engine 241 may receive, e.g., work product data from the work product database 207, prior work task data from a task database 206, and/or email data from an email database 205, related to the electronic meeting request 214. In some embodiments, the parse engine 241 may extract features from each of the electronic meeting request 214, the work product data, the prior work task data and the email data. In some embodiments, a task machine learning model 242 may utilize the features to predict work parameters, such as a work task duration, based on training according to historical work tasks and work product. In some embodiments, an optimizer 243 may optimize the parse engine 241 and/or the task machine learning engine 242 according to, e.g., an error of the predicted task parameters based on, e.g., attendee feedback. In some embodiments, each of the parse engine 241, task machine learning engine 242 and the optimizer 243 may include, e.g., software, hardware and/or a combination thereof.

In some embodiments, the parse engine 241 may transform the data as well as the electronic meeting request 214 into, e.g., feature vectors or feature maps such that the task machine learning engine 242 may generate unavailability period predictions based on features of the data. Thus, in some embodiments, the parse engine 241 may receive the data, parse the data, and extract features according to a feature extraction algorithm. Data parsing and feature extraction may utilize methods depending on a type of data being received. For example, the parse engine 241 may include language parsing when the data includes text and character strings. Thus, in some embodiments, the parse engine 241 may include, e.g., a classifier for natural language recognition. However, in some embodiments, the data may be a table. In such a case, the parse engine 241 may simply extract features into, e.g., a feature vector directly from the data. However, in some embodiments, the data may include a combination of character strings, as well as structured data, such as tables, tuples, lists, arrays, among other. Thus, in some embodiments, the parse engine 241 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., availability and meeting history features, personnel features, attendee location features, available meeting room features, and out-of-office features, among other possible features.

In some embodiments, the feature vectors produced by the parse engine 241 may be employed by the task machine learning engine 242 to develop a prediction for an optimum work task duration for an attendee to perform the requisite work task. In some embodiments, the task machine learning engine 242 is configured to make at least one prediction in response to the feature vectors: work task duration for completing the work task for each attendee. In some embodiments, the task machine learning engine 242 may utilize, e.g., classification machine learning techniques to develop a prediction from the work product features and prior work task features for each attendee having a respective work task to complete.

For example, in some embodiments, the task machine learning engine 242 may include, e.g., a convolutional neural network (CNN) having multiple convolutional layers to receive a feature map composed of each of the feature vectors, convolutionally weight each element of the feature map using the convolutional layers, and generate an output representing both the work task duration parameter.

In some embodiments, the calendar machine learning engine 242 may then convert the work task duration parameter into an unavailability time for a respective attendee. The unavailability time may be provided to the calendaring model 210 to schedule an unavailability period for each attendee with a work task to complete prior to the meeting of the electronic meeting request.

In some embodiments, the calendaring model 210 may use the collaboration databases 270 and the unavailability time to predict an unavailability period for each attendee to complete respective work tasks and/or projects. The calendaring model 210 may receive the data and employ a parse engine 211, a calendar machine learning engine 212 and an optimizer 213 to deduce a correlation between the data and an optimum work schedule, including the work location and the work time. In some embodiments, each of the parse engine 211, calendar machine learning engine 212 and the optimizer 213 may include, e.g., software, hardware and/or a combination thereof. For example, in some embodiments, the parse engine 211 may include a processor and a memory, the memory having instructions stored thereon that cause the processor to parse data. In some embodiments, the calendar machine learning engine 212 may include a processor and a memory, the memory having instructions stored thereon that cause the processor to predict optimum meeting times and locations from the parsed data. In some embodiments, the optimizer 213 may include a processor and a memory, the memory having instructions stored thereon that cause the processor to optimize the parse engine 211 and/or the calendar machine learning engine 212 according to, e.g., an error of the predicted unavailability period based on, e.g., user feedback.

In some embodiments, the parse engine 211 may transform the data as well as the user interaction 214 including the electronic meeting request into, e.g., feature vectors or feature maps such that the calendar machine learning engine 212 may generate unavailability period predictions based on features of the data. Thus, in some embodiments, the parse engine 211 may receive the data, parse the data, and extract features according to a feature extraction algorithm. Data parsing and feature extraction may utilize methods depending on a type of data being received. For example, the parse engine 211 may include language parsing when the data includes text and character strings. Thus, in some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., availability and meeting history features, personnel features, attendee location features, available meeting room features, and out-of-office features, among other possible features.

In some embodiments, the feature vectors produced by the parse engine 211 may be employed by the calendar machine learning engine 212 to develop a prediction for an optimum unavailability period and/or work location according to each work task and attendee associated with each work task. In some embodiments, the calendar machine learning engine 212 is configured to predict an unavailability period. In some embodiments, the calendar machine learning engine 212 may also make at least two additional predictions in response to the feature vectors: a set of assigned attendees assigned to the work task of the unavailability period time, and an optimum unavailability period location for the attendees in the set of assigned attendees to meet and complete the work task. In some embodiments, the calendar machine learning engine 212 may utilize, e.g., classification machine learning techniques to develop a prediction from the availability and meeting history features, personnel features, attendee location features, and available meeting room features for each work task of the electronic meeting request 214. In some embodiments, the result of this prediction process produces an unavailability period time parameter, a set of assigned attendees parameter, and an unavailability period location parameter for each work task that correspond to an optimal work time and location for all of the assigned to each work task. For example, where a single attendee is responsible for a given work task, the calendar machine learning model 212 may determine a work location including the single attendee's office or home.

For example, in some embodiments, the calendar machine learning engine 212 may include, e.g., a convolutional neural network (CNN) having multiple convolutional layers to receive a feature map composed of each of the feature vectors, convolutionally weight each element of the feature map using the convolutional layers, and generate an output representing the unavailability period parameters. However, in some embodiments, the calendar machine learning engine 212 may include three models, an unavailability period machine learning model and an unavailability period time machine learning model. Each of the unavailability period location machine learning model and the unavailability period time machine learning model may receive the feature map and generate respective outputs of the unavailability period location parameter and the unavailability period time parameter separately.

In some embodiments, the calendar machine learning engine 212 may then convert the unavailability period location parameter and the unavailability period time parameter into a meeting request to submit to the user and any other assigned attendees of each work task. In some embodiments, the meeting request is transmitted to the user computer 260 to produce a meeting request indication for the user to select, decline, or modify. The selection and/or modification may cause the collaboration system 200 to automatically book a meeting room associated with the unavailability period location parameter at the time associated with the unavailability period time parameter.

In some embodiments, one or more of the user and/or attendees may accept, decline or modify the meeting request with a response. The response or responses may then be returned to an optimizer 213 that evaluates the unavailability period location parameter and the unavailability period time parameter against a ground truth. Here, the ground truth may be the responses associated with the meeting request. Thus, in effect, each response to the meeting request may be used as feedback into the optimize 213 to optimize the calendaring model 210 for on-line learning. Thus, in some embodiments, the optimizer 213 may determine an error associated with the predicted unavailability period location parameter and unavailability period time parameter as compared to the time and location of the meeting request and whether the meeting request was accepted or not. In some embodiments, the optimizer 213 may backpropagate the error to the parse engine 211, the calendar machine learning engine 212, or both to train each engine in an on-line fashion.

Figure 3:
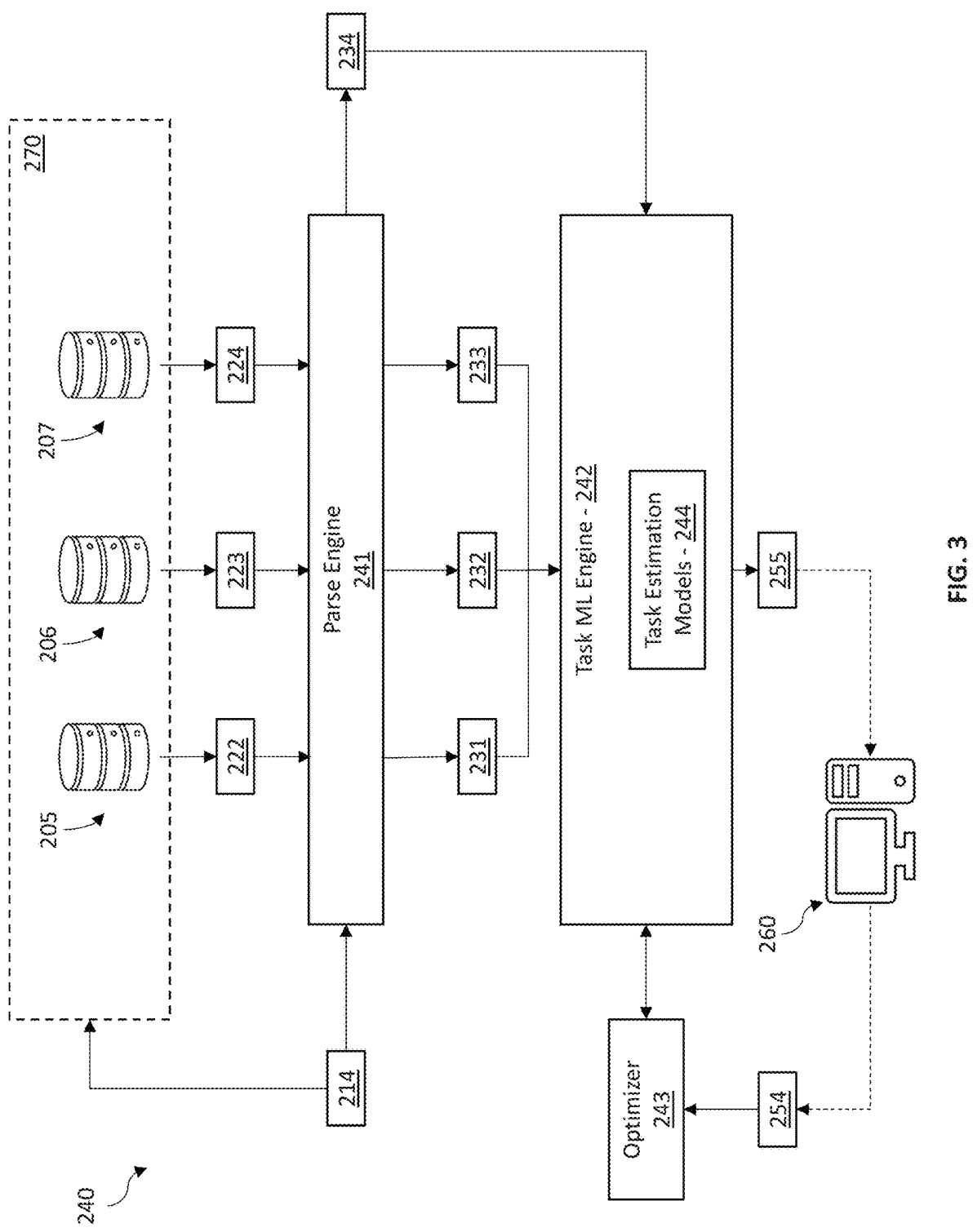

FIG. 3 depicts a diagram of a task model for an exemplary illustrative automated calendar management system in accordance with an illustrative embodiment of the present invention.

In some embodiments, an electronic meeting request 214 is received by a task model 240. Meetings and conferences may require one or more of the attendees to complete some task in preparation for the meeting. For example, a meeting may be scheduled for a status update on a particular project. People invited to the meeting may have certain roles in the project, and thus certain roles in the meeting that require tasks to be completed to perform the role. A manager may need to provide status updates on the project, projections and timelines for future progress, financial details, among others. An employee may need to provide demonstrations of portions of the project. Many different scenarios are possible, and in many cases, an employee may be required to complete, e.g., a presentation, a demonstration, a speech, or other work product for the meeting. As a result, in some embodiments, based on the electronic meeting request 214, the task model 240 may predict a set of work tasks for each attendee specified in the electronic meeting request 214 and a time period required to complete each work task prior to the meeting associated with the electronic meeting request 214. In some embodiments, such predictions may be performed according to known data regarding the project related to the electronic meeting request 214 as well as each attendee's history about performing similar tasks. Thus, in some embodiments, the task model 240 may also receive data from, e.g., an emailing database 205, a task database 206 and a work product database 207, among other possible databases related to the performance of work tasks.

The electronic meeting request 214 may include, e.g., a list of attendees, a date range, a subject and or text related to a subject of the meeting, among other text and data related to the meeting. In some embodiments, a parse engine 241 may receive the electronic meeting request 214 and parse it to identify, e.g., attendee data, data range data, and subject data, among other possible data. The parse engine 241 may employ, e.g., a suitable text recognition algorithm and/or model to determine the data from, e.g., text and/or characters, structured data such as tables, lists, tuples, arrays, etc., among other forms of information in the electronic meeting request 214. Thus, in some embodiments, the parse engine 241 may determine structured data regarding attendees, dates and subjects associated with the electronic meeting request 214. However, in some embodiment, the electronic meeting request 214 may be configured to be in a structured form that is structured to match the data contained therein with data in the collaboration databases 270. In some embodiments, the data from the electronic meeting request 214, whether preformatted or parsed by the parse engine 241 to identify the data, may be used to pull similar and/or matching data from the collaboration databases 270 including, e.g., the emailing database 205, the task database 206 and the work product database 207. The matching may be performed according to, e.g., a classification algorithm, a clustering algorithm, a data look-up methodology, or other form of matching. Thus, in some embodiments, similar or related, e.g., email data 222, task history data 223, and work product data 224 may be identified and received by the parse engine 241 from the collaboration databases 270. In some embodiments, collaboration databases 270 such as the emailing database 205, the task database 206 and the work product database 207, may receive the electronic meeting request 214 directly to each separately perform matching and communicate the matching results to the parse engine 241.

In some embodiments, the email data 222 may include emails matched to the electronic meeting request 214 as related to the meeting. Such a match may be determined based on a comparison between, e.g., attendees of the electronic meeting request 214 and senders and recipients of emails in the email database 205, subject of the electronic meeting request 214 and subjects and/or information in the email body of each email in the email database 205, among other comparisons to determine related emails.

In some embodiments, the electronic meeting request 214 and the related email data 222 may assist with determining a work task required to be completed by one or more of the attendees prior to the meeting. In some embodiments, the task database 206 may include all assigned and/or open work tasks of each attendee, as well as all other, e.g., employees of a company or members of an organization. Thus, in some embodiments, the work task data 223 may include data identifying the work task that needs to be completed, a date of assignment of each work task, a description of each work task, an identification of a worker and/or team of workers to complete each work task, a project to which each work task is a part, among other data.

In some embodiments, the parse engine 241 may receive work task data 223 related to each requisite work task from the task database 206. For example, by comparing the subject of email data 222 and the electronic meeting request 214 with subjects and/or names of tasks in the task database 206, the task database 206 and/or the parse engine 241 may identify similar or related work tasks. For example, in some embodiments, the work task data 223 includes tasks that are related to the electronic meeting request 214 that may be reviewed in preparation for the meeting. In some embodiments, the work task data 223 includes tasks that must be completed prior to the meeting. In some embodiments, the work task data 223 include both tasks to be reviewed in preparation for the meeting as well as tasks that need to be completed for the meeting. In some embodiments, the work task data 223 also includes historical work tasks that are similar to the subject of the electronic meeting request 214 and/or related email data 222.

In some embodiments, the parse engine 241 may receive work product data 224 from the work product database 207. The work product data 224 may include data related to completed work for historical tasks of each attendee. In some embodiments, based on the electronic meeting request 214 and associated subject and attendee data, and/or the related email data 222 and work task data 223, the parse engine 241 and/or the work product database 207 may identify similar or related work product. For example, the work product may include documents for completed tasks, application version source code, presentations, reports and any other work product. In some embodiments, the work product data 224 may include the associated work product as well as data related to, e.g., assignment data, completion date, related work task data, related projects, among other data and information.

In some embodiments, the email data 222, the work task data 223, the work product data 224 and/or the electronic meeting request 214 may include unstructured data, such as, e.g., text strings, characters, images, among other unstructured data. Accordingly, the parse engine 241 may include, e.g., include language parsing when the data includes text and character strings, object recognition and/or optical character recognition or images, among other data recognition techniques. However, in some embodiments, the email data 222, the work task data 223, the work product data 224 and/or the electronic meeting request 214 may be pre-formatted according to a suitable format including, e.g., tables, tuples, lists, arrays, among other data formats.

In some embodiments, the parse engine 241 may extract features from the parsed and formatted email data 222, work task data 223, work product data 224 and/or electronic meeting request 214 according to, e.g., a feature extraction algorithm or technique. In some embodiments, the feature extraction algorithm or technique may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semi-definite embedding, autoencoding, among others and combinations thereof. As a result, the parse engine 241 may generate feature vectors having, e.g., email features 231, work task features 232, work product features 233 and meeting request features 234. In some embodiments, the meeting request features 234 include work task objects based on, e.g., features extracted from text including a subject or body text of the electronic meeting request 214 that set forth a task, role, project or other responsibility of an attendee. In some embodiments, the feature vectors are aggregated into a feature map prior to modeling in the task machine learning engine 242. In some embodiments the feature vectors are provided to the task machine learning engine 242 as separate feature vectors.

In some embodiments, the task machine learning engine 242 receives the feature vectors from the parse engine 241, including, but not limited to, the email features 231, the task features 232, the work product features 233 and the meeting request features 234. In some embodiments, the task machine learning engine 242 employs task estimation models 244 to determine an optimum scheduling for work tasks based on the extracted features. In some embodiments, the extracted features represent a history of tasks assigned to, completed by, and in progress by each attendee. Based on this history, the task estimation models 244 may employ trained models that have been trained with this history to correlate task characteristics with a time needed to complete the task. For example, task characteristics may include, e.g., task type (e.g., presentation, speech, analysis, memorandum, report, project task, or any other work task), assignment date, progress based on task history and/or work product features 232 and 233, project type where the project refers to a broader task group to which the task belongs, among other characteristics. Thus, based on machine learning techniques, such as those described above, including, but not limited to, neural networks and deep learning techniques, the task estimation models 244 may predict an amount of time for each attendee to complete respective tasks.

As a result, in some embodiments, based on the features, the task estimation models 244 of the task machine learning engine 242 may generate predicted work task parameters 255. Predicted work task parameters 255 including a task duration parameter that represents a predicted time required to complete the work task of the work task object extracted from the electronic meeting request 214.

In some embodiments, the predict work task parameters 255 may be presented to a user, e.g., as part of an electronic calendar appointment incorporating work task duration at a user computing device 260. In response, a user may provide a user selection 254 including an acceptance, rejection, or modification of the electronic calendar appointment based on the work task duration. In some embodiments, the user selection 254 may be provided to an optimizer 243 of the task model 240. In some embodiments, the optimizer 243 may compare the user selection 254 to the corresponding predicted work task parameter. Based on a difference between the user selection 254 to the corresponding predicted work task parameter 255, the optimizer 243 may determine an error in the predictions by the task machine learning engine 242. In some embodiments, the optimizer 243 backpropagates the error to the task machine learning engine 242 to train the task estimation models 244 in an on-line fashion such that each prediction may be used as a training pair with the corresponding user selection. Thus, the task estimation models 244 may be updated as users provide user selections 254 to continually improve the task estimation models 244. In some embodiments, the optimizer 243 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user selection 254 may be a second selection after an initial selection. For example, where a user initially accepts, e.g., an appointment based on the predicted work product parameters 255 via the user selection 254, the user may later cancel the appointment by a second user selection 254. The second user selection 254 may be provided to the optimizer 243 in a similar fashion to the initial user selection 254 to determine an error and train the task machine learning engine 242.

Figure 4:
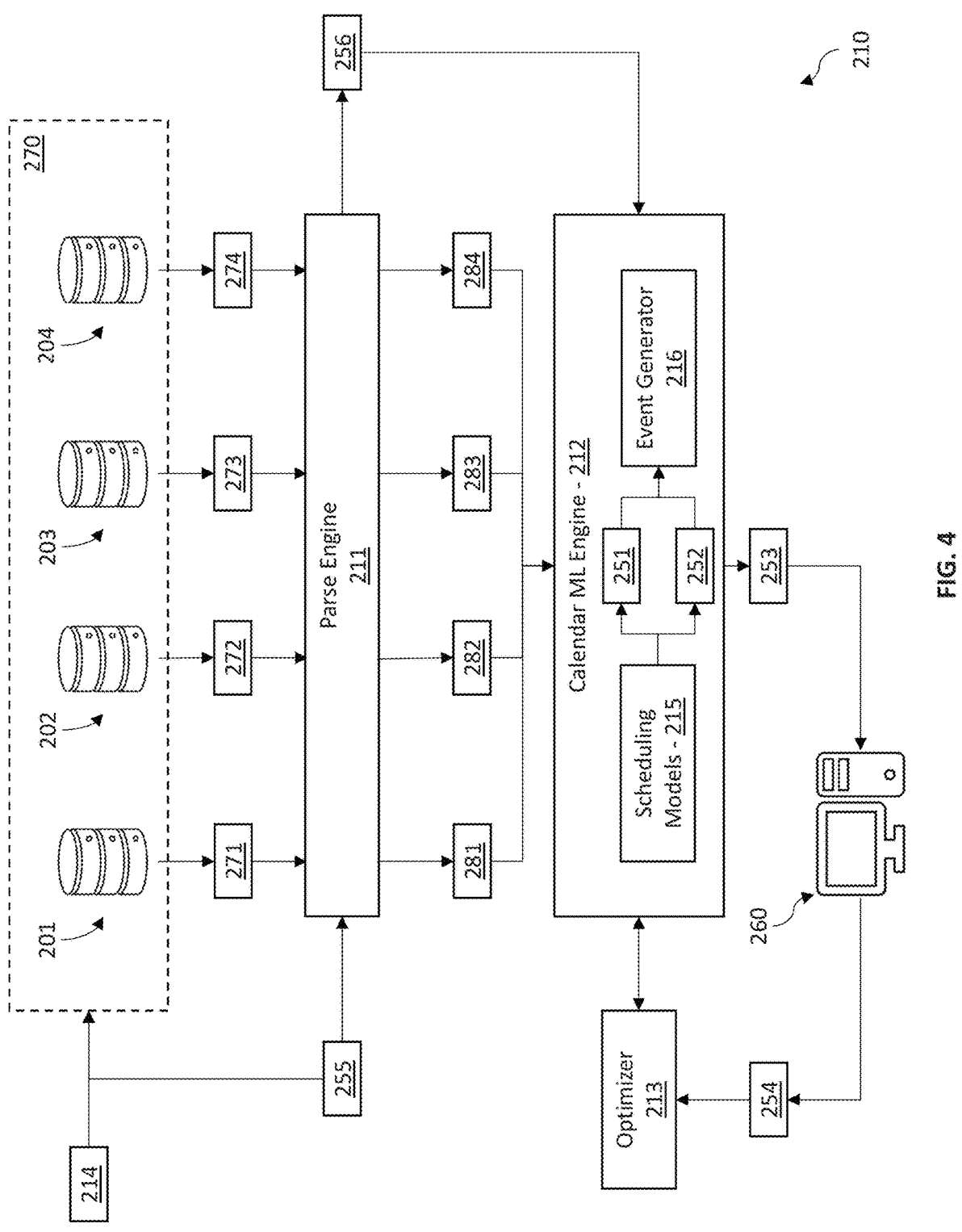

FIG. 4 depicts a diagram of a calendaring model for an exemplary illustrative automated calendar management system in accordance with an illustrative embodiment of the present invention.

In some embodiments, a collaboration system 210 may initiate an automated meeting rescheduling process upon receipt of an electronic meeting request, such as the electronic meeting request 214 described above. In some embodiments, the electronic meeting request 214 includes an identification of the associated user and a task model, such as the task model 240 described above, determines an associated work task and predicted work task parameter 255. In some embodiments, the predicted work task parameter 255 includes, e.g., a predicted work task duration associated with an amount of time that the user will require to complete the associated task. In some embodiments, the predicted work task parameter 255 may include data formatted for the calendar model 210 and ready to undergo feature extraction.

However, in some embodiments, the predicted work task parameter 255 may include an image, character string, or other unstructured data related to the work tasks. In some embodiments, where the predicted work task parameter 255 is unstructured, the parse engine 211 may parse the predicted work task parameter 255 using, e.g., a parsing algorithm such as a natural language recognition model, an image recognition model, or other algorithm.

In some embodiments, the predicted work task parameter 255 include a predicted work duration and a predicted task group associated with a group of attendees responsible for the associated task. In some embodiments, the collaboration databases 270 determine the task group responsible for the associated in task. In some embodiments, the task group is assumed to include only the associated user. However, in some embodiments, combinations of the above are included.

In some embodiments, based on the predicted work task parameter 255, the calendar model 210 may pull data from collaboration databases 270 including each of the calendar database 201, the location database 203, and the meeting room database 204 associated with, e.g., the electronic meeting request 214. Accordingly, the parse engine 211 may receive, e.g., availability and meeting history data 221 from the calendar database 201 related to meetings within a given period, e.g., within about one week, within about one month, within about six months, or other period. Similarly, the parse engine 211 may receive, e.g., attendee location data 223 and available meeting room data 224 from the location database 203 and the meeting room database 204, respectively.

In some embodiments, collaboration system 210 may direct the predicted work task parameter 255 to the collaboration databases 270. In response to the predicted work task parameter 255, each of the calendar database 201, the organization database 202, the location database 203 and the meeting room database 204 may determine data to provide to the parse engine 211. In some embodiments, the calendar database 201 may identify the scheduled meetings and determine attendees for each scheduled meeting. In some embodiments, the calendar database 201 may also identify a meeting history associated with each attendee including the user, including scheduled meetings, cancelled meetings, rescheduled meetings, relocated meetings, among other meeting history items. In some embodiments, the calendar database 201 may provide the scheduled meetings, attendees, and meeting histories to the parse engine 211 as availability and meeting history data 271.

In some embodiments, the organization database 202 may utilize the attendees identified by the calendar database 201 to identify attendee hierarchy within an associated organization according to, e.g., an organization chart or other data related to personnel hierarchy for the associated organization. The organization database 202 may provide the attendee hierarchy based on the, e.g., organization chart, to the parse engine 211 as personnel data 272 associated with each attendee of each scheduled meeting.

In some embodiments, the location database 203 may utilize the attendees identified by the calendar database 201 to identify locations, such as, e.g., office locations, of each of the attendees of each of the scheduled meetings. The location database 203 may provide the location information to the parse engine 211 as attendee location data 273.

In some embodiments, the meeting room database 204 may utilize electronic meeting request 214 and the predicted work task parameters 214 to determine a set of available meeting rooms for a predetermined period into the future, such as, e.g., about a week, about a month, about two months, about three months, about 6 months, or any other suitable period into the future. For example, in some embodiments, the meeting room database 204 may track meeting room characteristics, including, e.g., availability, location, size, resources, among other characteristics for each known meeting location. The meeting room database 204 determine a set of available meeting rooms based on the meeting room availability within, e.g., about one week, about two weeks, about one month, or other suitable time, according to size needs, such as, e.g., a number of attendees in the electronic meeting request 214 and/or a number of attendees associated with a task of the predicted work task parameter 255. The characteristics of the set of available meeting rooms may be provided to the parse engine 211 as available meeting room data 274.

In some embodiments, the parse engine 211 may receive, e.g., each of the predicted work task parameter 255, the availability and meeting history data 221, the personnel data 222, the attendee location data 223 and the available meeting room data 224 and extract features. Thus, in some embodiments, the parse engine 211 may transform the data into, e.g., feature vectors or feature maps. Thus, in some embodiments, the parse engine 211 may receive the data, parse the data, and extract features according to a feature extraction algorithm. Data parsing and feature extraction may utilize methods depending on a type of data being received. For example, the parse engine 211 may include language parsing when the data includes text and character strings. In some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings.

In some embodiments, as a result of the parsing and feature extraction, the parse engine 211 may produce meeting history features 281, personnel features 282, attendee location features 283, available meeting room features 284 and predicted work task features 256 from each of the meeting history data 271, the personnel data 272, the attendee location data 273, the available meeting room data 274, and the predicted work task parameter 255, respectively.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., meeting history features 281, the personnel features 282, the attendee location features 283 and the available meeting room features 284 such that predictive features of scheduling information and location information can be provided to the calendar machine learning engine 212. In some embodiments, the feature vectors are aggregated into a feature map prior to modeling in the calendar machine learning engine 212.

In some embodiments, the calendar machine learning engine 212 receives the meeting history features 281, the personnel features 282, the attendee location features 283, the available meeting room features 284 and the work task features 256 to model meeting time and location for each meeting affected by the electronic meeting request 214 to predict optimum scheduled meetings. In some embodiments, the calendar machine learning engine 212 includes scheduling models 215 to predict the location and time of a meeting that is most likely to be accepted by all attendees.

In some embodiments, the scheduling models 215 may include separate models for predicting meetings to be scheduled, predict meeting times for the meetings to be scheduled, and predicting meeting locations for meetings to be scheduled. In some embodiments, the scheduling models 215 may first determined the meetings to be scheduled using a scheduling model based on the work task features 256. The scheduling models may provide the meetings to be scheduled to each of a meeting time model and a meeting location model.

In some embodiments, the meeting time model may predict a meeting time parameter 251 that represents an optimum meeting time for each attendee of each meeting to be scheduled and an optimum task schedule for each attendee having an associated task according to the predicted work task parameter 255. In some embodiments, the meeting time model may predict the meeting time parameter 251 based on the predicted work task parameter 255, scheduling information and personnel information, including, e.g., predicted work task parameter 255, the meeting history features 281, the personnel features 282 and the available meeting room features 284. In some embodiments, using, e.g., a classifier, such as those described above, the meeting time model may transform the work task features 256, the meeting history features 281, the personnel features 282 and the available meeting room features 284 into a feature vector output that may be decoded into the meeting time parameter 251 representing the optimum meeting time for the meeting of the electronic meeting request 214 and/or for a meeting to complete a requisite work task of associated attendees based on the scheduling information of the attendees and meeting rooms.

In some embodiments, the meeting location model may predict a meeting location parameter 252 that represents an optimum meeting location for each attendee of each meeting to be scheduled, and/or an optimum meeting location for each attendee associated with a work task according to the predicted work task parameter 255. In some embodiments, the meeting location model may predict the meeting location parameter 252 based on location information and personnel information, including, e.g., the work task features 256, the meeting history features 281, the personnel features 282, the attendee location features 283 and the available meeting room features 234. In some embodiments, using, e.g., a classifier, such as those described above, the meeting location model may transform the work task features 256, the meeting history features 281, the personnel features 282, the attendee location features 283 and the available meeting room features 284 into a feature vector output that may be decoded into the meeting location parameter 252 representing the optimum meeting location for the meeting of the electronic meeting request 214 and/or for a meeting to complete a requisite work task of associated attendees based on the location information of the attendees and meeting rooms.

While an arrangement of the scheduling models 215 is described above in accordance with some embodiments of the present collaboration system 200, some embodiments may differ. In some embodiments, the scheduling models

215 may include a single model that predicts both the meeting time parameter 251 and the meeting location parameter 252 based on a feature map formed from the work task features 256, the meeting history features 281, the personnel features 282, the attendee location features 283 and the available meeting room features 284. In some embodiments, the scheduling models 215, the meeting time model and meeting location model operate in parallel and combine outputs to form the meeting location parameter 252 and the meeting time parameter 251. In some embodiments, the scheduling model 215, the meeting time model and meeting location model operate in series, with the output of the scheduling model being provided to the meeting location model, and the output of the meeting location model being provided to the meeting time model to generate the meeting time parameter 251 and the meeting location parameter 252. In some embodiments, the meeting time model performs the predictions of the rescheduling model concurrently with predicting the meeting time parameter 251. Other combinations of models are contemplated as well.

In some embodiments, an event generator 216 of the calendar machine learning engine 212 may receive the meeting time parameter 251 and the meeting location parameter 252 to generate a candidate meeting 253 including an unavailability period object representing and unavailability period for each attendee having a work task. The candidate meeting 253 represents a meeting request for a corresponding meeting to be scheduled associated with the electronic meeting request 214 and the unavailability period object represents a duration prior to the meeting to be scheduled to complete a work task of the electronic meeting request 214, including a time and location for the meeting and a time and location for the unavailability period. In some embodiments, the event generator 216 may dynamically secure the candidate meeting 253 by automatically book a meeting a room at the specified time and location. In some embodiments, the candidate meeting 253 is first provided to each attendee at a user computing device 260. Each attendee may then accept, decline or request an alternative time or location according to a user selection 254. In some embodiments, the user selection 254 may cause the dynamic securing of the meeting time at the meeting location according to the candidate meeting 253, including the unavailability period represented by the unavailability period object.

In some embodiments, the candidate meeting 253 identifies a meeting time and location in response to the electronic meeting request 214. However, in some embodiments, the candidate meeting 253 includes an unavailability period object representing an unavailability period with an appointment to complete a work task associated with one or more attendees in the electronic meeting request, where the work task is a task that the one or more attendees must complete prior to a meeting associated with the electronic meeting request 214. In some embodiments, the candidate meeting 253 includes a candidate scheduled meeting in response to the electronic meeting request 214 as well as a schedule for an appointment for the one or more users to complete the associated work task. In such cases, the appointment to complete the work task may include a scheduled unavailability time for each of the associated users for an amount of time corresponding to the predicted work task parameter 255, including the predict work task duration from, e.g., a task model 240 such as the task model 240 described above. Thus, the calendar model 210 may generate an unavailability period object that represents a prediction for an unavailability period for attendees responsible for work tasks as well as predicted a schedule and location of a meeting to which the work task is associated. Thus, attendees may automatically have electronic calendar appointments scheduled to complete necessary work tasks for upcoming meetings without interruption.

In some embodiments, the user selection 254 may be provided to an optimizer 213 of the calendaring model 213. In some embodiments, the optimizer 213 may compare the user selection 254 to the corresponding predicted meeting time parameter 251 and meeting location parameter 252. Based on a difference between the user selection 254 to the corresponding predicted meeting time parameter 251 and meeting location parameter 252, the optimizer 213 may determine an error in the predictions by the calendar machine learning engine 212. In some embodiments, the optimizer 213 backpropagates the error to the calendar machine learning engine 212 to train the scheduling models 215 in an on-line fashion such that each prediction may be used as a training pair with the corresponding user selection. Thus, the scheduling models 215 may be updated as users provide user selections 254 to continually improve the scheduling models 215. In some embodiments, the optimizer 213 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user selection 242 may be a second selection after an initial selection. For example, where a user initially accepts the candidate meeting 253 via the user selection 254, the user may later cancel the meeting by a second user selection 254. The second user selection may be provided to the optimizer 213 in a similar fashion to the initial user selection 254 to determine an error and train the calendar machine learning engine 212. Moreover, the user selection 254 and/or the candidate meeting 253 may be provided to the meeting history of each attendee in the calendar database 201 to update the calendar database 201 with current information.

Similarly, in some embodiments, the user selection 254 and/or the corresponding candidate scheduled meeting 253 may be provided to each of the location database 203 and the meeting room database 204 to update information related to the location of attendees and availability of meeting rooms at the time of the candidate meeting 253. In some embodiments, the collaboration databases 270 are only updated upon the user selection 254.

Figure 5:
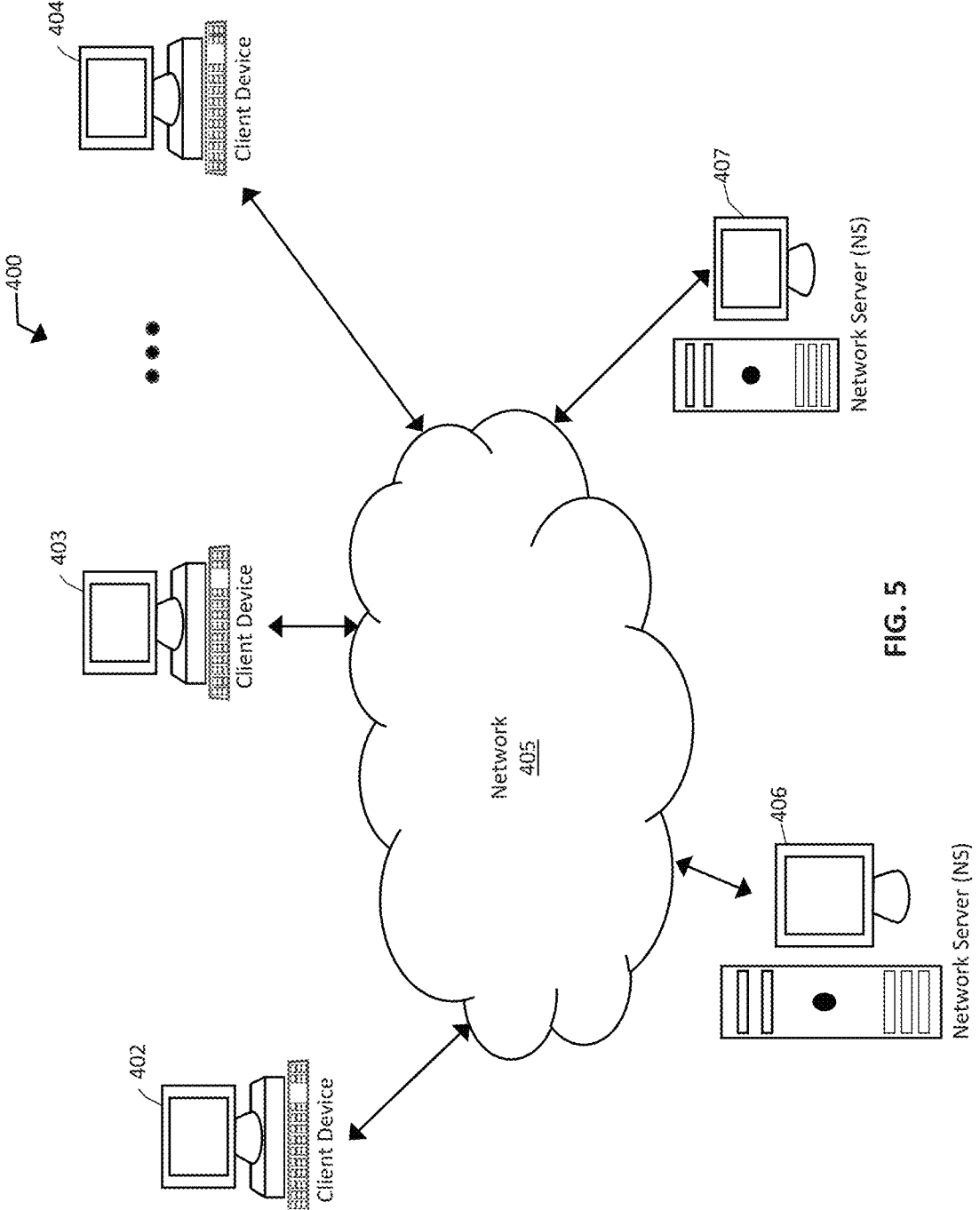

FIG. 5 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile Communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 5, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
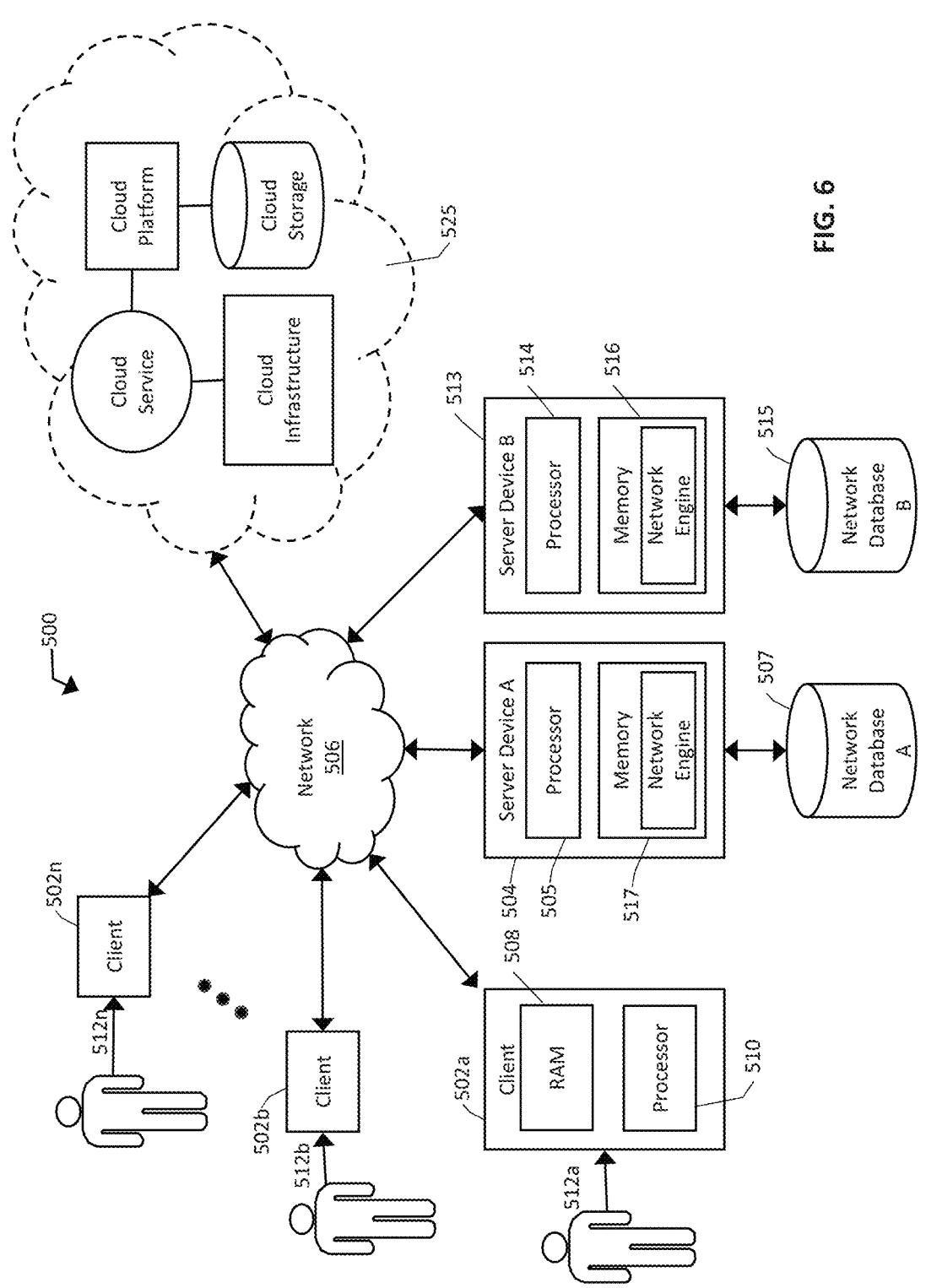

FIG. 6 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through n may also comprise a number of external or internal devices such as a mouse, a CD-ROM, DVD, a physical or virtual keyboard, a display, or other input or output devices. In some embodiments, examples of member computing devices 502a through n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through n may be specifically programmed with one or more application programs in accordance with one or more principles/methodologies detailed herein. In some embodiments, member computing devices 502a through n may operate on any operating system capable of supporting a browser or browser-enabled application, such as Microsoft™, Windows™, and/or Linux. In some embodiments, member computing devices 502a through n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through n, users, 512a through n, may communicate over the exemplary network 506 with each other and/or with other systems and/or devices coupled to the network 506. As shown in FIG. 6, exemplary server devices 504 and 513 may be also coupled to the network 506. In some embodiments, one or more member computing devices 502a through n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
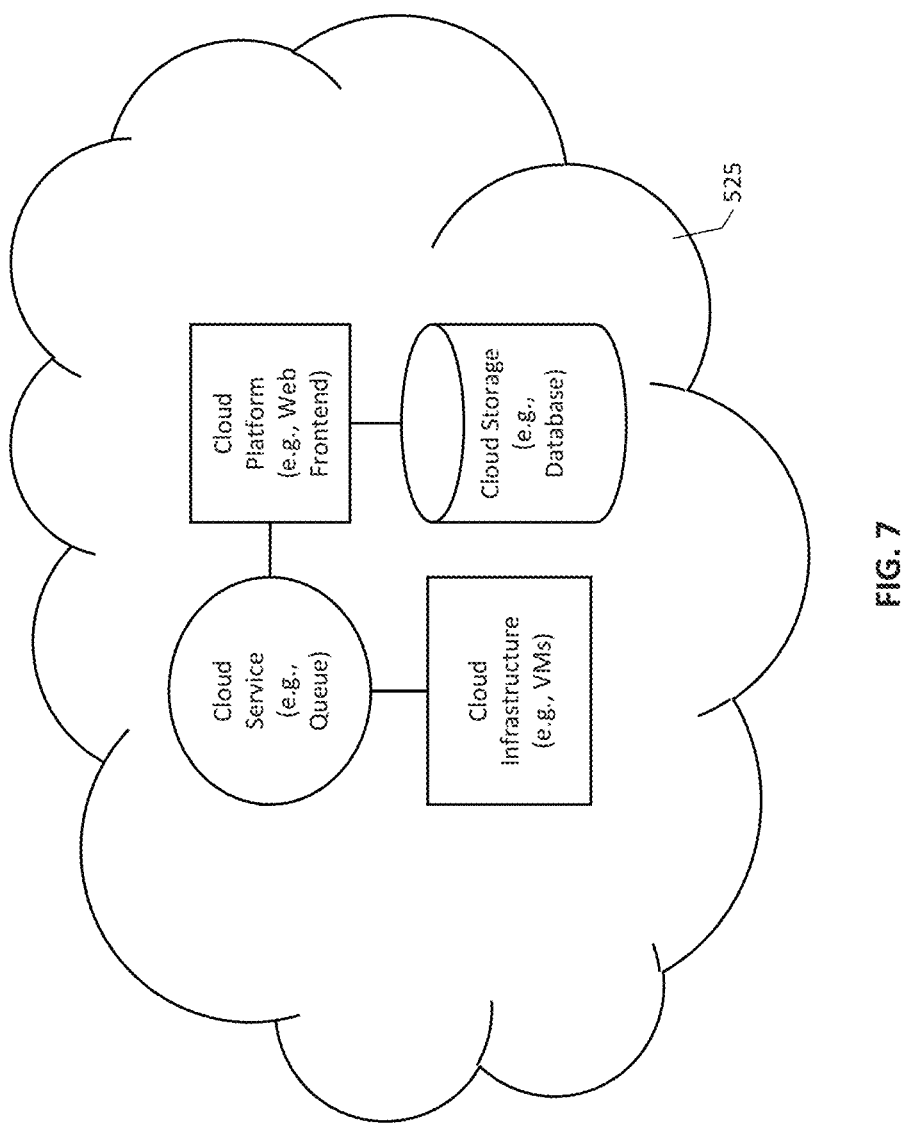
Figure 8:
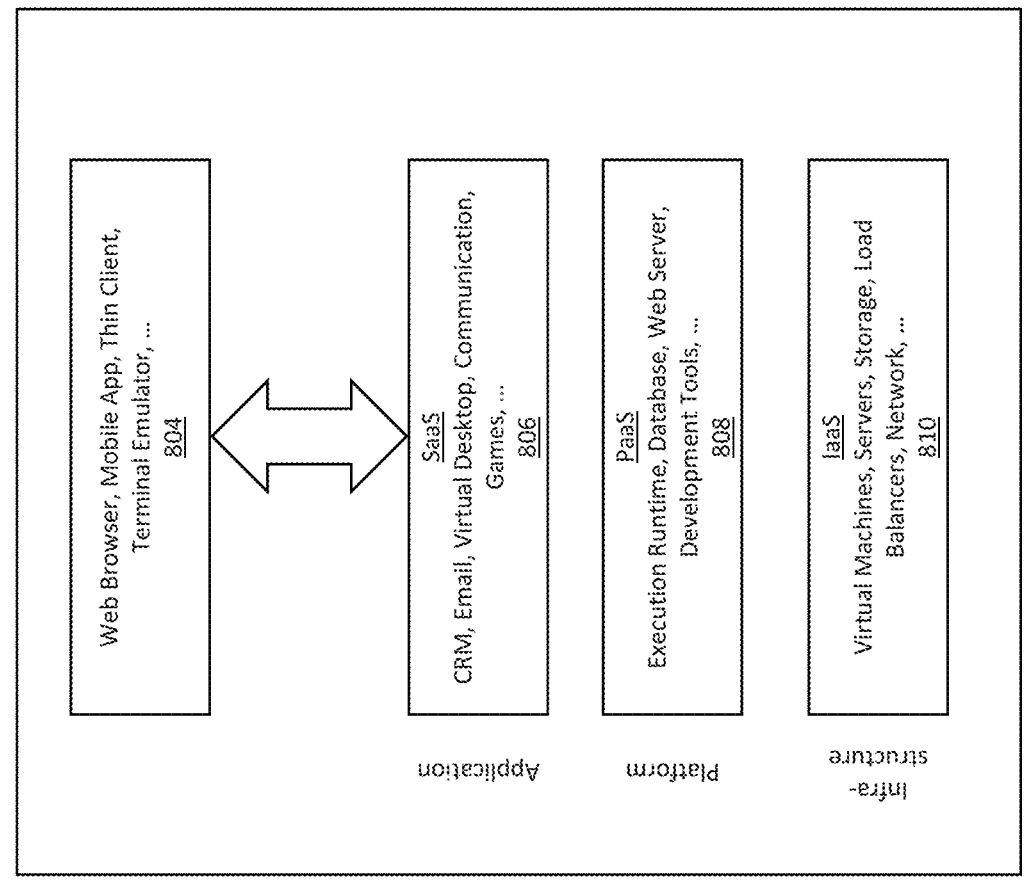

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method comprising:

receiving, by at least one processor, a plurality of electronic meeting requests to schedule a meeting;

wherein each electronic meeting request comprises an attendee data item identifying at least one respective attendee of each respective meeting;

determining, by the at least one processor, a plurality of work task data items identifying a respective plurality of work tasks associated with the at least one respective attendee;

wherein the plurality of work task data items is stored in at least one task database;

utilizing, by the at least one processor, a task estimation machine learning model to predict a plurality of work parameters of at least one meeting task object based at least in part on:

i) the plurality of work task data items, and ii) a work history data identifying work history of the at least one respective attendee;

wherein the at least one meeting task object represents at least one respective work task that the at least one respective attendee would be required to complete prior to the respective meeting;

wherein the plurality of work parameters comprises a task duration parameter representing a predicted time that the at least one respective attendee requires to complete the at least one respective work task associated with each respective meeting;

wherein the work history data comprises:

i) prior work task data items identifying at least one completed respective work task by the at least one respective attendee, and ii) prior task duration data items identifying a time that took the at least one respective attendee to complete the at least one completed respective work task;

utilizing, by the at least one processor, a meeting scheduling machine learning model to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request;

wherein the plurality of parameters of at least one meeting room object comprises:

i) an unavailability period location parameter, and ii) an unavailability period time parameter;

wherein the schedule information comprises:

i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, wherein the meeting history data comprises:

1) cancellation data identifying meeting cancellations, and 2) rescheduling data identifying meeting rescheduling occurrences;

wherein the location information comprises:

i) an attendee location data identifying at least one respective location associated with the at least one respective attendee, ii) available meeting room data identifying all available meeting rooms, and iii) a meeting room location associated with each available meeting room;

causing to display, by the at least one processor, an indication of the at least one unavailability period in response to the at least one electronic meeting request on a screen of at least one computing device associated with the at least one respective attendee based at least in part on the plurality of predicted parameters of the at least one unavailability period object representing the at least one respective unavailability period;

receiving, by the at least one processor, a selection of the at least one respective unavailability period from the at least one respective attendee; and dynamically securing, by the at least one processor, the at least one respective unavailability period prior to the at least one respective meeting.

2. The method of clause 1, further comprising parsing, by the at least one processor, text data of the plurality of respective electronic meeting requests to identify the plurality of work task data items identifying the respective plurality of work tasks associated with the at least one respective attendee.

3. The method of clause 1, further comprising:

determining, by the at least one processor, a plurality of respective emails associated with the at least one respective attendee of each respective meeting based at least in part on the at least one respective attendee of the at least one respective meeting; and parsing, by the at least one processor, text of the plurality of respective emails associated with the at least one respective attendee of each respective meeting to identify the plurality of work task data items identifying the respective plurality of work tasks associated with the at least one respective attendee.

4. The method of clause 1, wherein the attendee location data associated with the at least one respective attendee comprises a real-time location based on tracking an employee badge.

5. The method of clause 1, wherein the attendee location data associated with the at least one respective attendee comprises a real-time location based on global positioning (GPS) data associated with an attendee mobile device.

6. The method of clause 1, further comprising receiving, by the at least one processor, the plurality of respective work task data items from a task scheduling application.

7. The method of clause 1, further comprising determining, by the at least one processor, one or more respective related documents in a cloud storage based at least in part on the plurality of work task data items identifying the respective plurality of work tasks associated with the at least one respective attendee;

wherein the one or more respective related documents are related to the respective plurality of work tasks.

8. The method of clause 7, further comprising:

causing to display, by the at least one processor, a respective reminder indication of a respective unavailability period on a screen of the at least one computing device associated with the at least one respective attendee;

wherein the respective reminder comprises:

i) an attachment for each of the one or more related documents, and ii) the meeting time associated with the respective plurality of work tasks.

9. The method of clause 1, further comprising:

receiving, by the at least one processor, a scheduling response from at least one computing device associated with the at least one respective attendee responsive to a selection by the at least one attendee;

wherein the scheduling response comprising one of:

i) an acceptance, ii) a denial, and iii) a request for a different work location, a different work time, or both;

determining, by the at least one processor, an error associated with the plurality of work parameters based at least in part on the scheduling response; and training, by the at least one processor, the task estimation machine learning model based at least in part on the error.

10. The method of clause 1, The method of clause 1, wherein the meeting scheduling machine learning model is further utilized to predict attendee prioritization parameters that represent a priority of the availability associated with each of the at least one attendee according to each respective hierarchical position associated with each respective at least one attendee;

wherein the attendee prioritization parameter comprises:

i) a scheduling priority parameter associated with the schedule information of the at least one respective attendee, and ii) a location priority parameter associated with the location information associated with the at least one respective attendee; and wherein the hierarchical position of each of the at least one attendee is based on an organization chart.

11. A method comprising:

receiving, by at least one processor, at least one respective work task modification indication representative of completion of at least one respective work task associated with at least one respective meeting;

wherein at least one respective work task modification indication comprises:

i) an attendee data identifying at least one respective attendee of the at least one respective meeting, and ii) a modification to a respective unavailability period time parameter;

determining, by the at least one processor, an error in a plurality of work parameters of at least one meeting task object predicted by a task estimation machine learning model based at least in part on a difference between at the at least one respective work task modification indication and respective work parameters;

wherein the at least one meeting task object represents at least one respective work task that the at least one respective attendee would be required to complete prior to respective meeting;

training, by the at least one processor, the task estimation machine learning model based at least in part on the error of a plurality of the respective work parameters;

determining, by the at least one processor, a plurality of work task data items identifying a respective plurality of work tasks associated with the at least one respective attendee;

wherein the plurality of work task data items is stored in at least one task database;

utilizing, by the at least one processor, the task estimation machine learning model to predict a plurality of new work parameters of at least one meeting task object based at least in part on:

i) the plurality of work task data items, and ii) a work history data identifying work history of the at least one respective attendee;

wherein the plurality of work parameters comprises a task duration parameter representing a predicted time that the at least one respective attendee requires to complete the at least one respective work task associated with each respective meeting;

wherein the work history data comprises:

i) work task data items identifying at least one completed respective work task by the at least one respective attendee, and ii) prior task duration data items identifying a time that took the at least one respective attendee to complete the at least one completed respective work task;

utilizing, by the at least one processor, a meeting scheduling machine learning model to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request;

wherein the plurality of parameters of at least one meeting room object comprises:

i) a new unavailability period location parameter, and ii) a new unavailability period time parameter;

wherein the schedule information comprises:

i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, wherein the meeting history data comprises:

1) cancellation data identifying meeting cancellations, and 2) rescheduling data identifying meeting rescheduling occurrences;

wherein the location information comprises:

i) an attendee location data identifying at least one respective location associated with the at least one respective attendee, ii) available meeting room data identifying all available meeting rooms, and iii) a meeting room location associated with each available meeting room;

causing to display, by the at least one processor, an indication of the at least one unavailability period in response to the at least one electronic meeting request on a screen of at least one computing device associated with the at least one respective attendee based at least in part on the plurality of predicted parameters of the at least one unavailability period object representing the at least one respective unavailability period;

receiving, by the at least one processor, a selection of the at least one respective unavailability period from the at least one respective attendee; and dynamically securing, by the at least one processor, the at least one respective unavailability period prior to the at least one respective meeting.

12. The method of clause 11, further comprising parsing, by the at least one processor, text data of the plurality of respective electronic meeting requests to identify the plurality of work task data items identifying the respective plurality of work tasks associated with the at least one respective attendee.

13. The method of clause 11, further comprising:

determining, by the at least one processor, a plurality of respective emails associated with the at least one respective attendee of each respective meeting based at least in part on the at least one respective attendee of the at least one respective meeting; and parsing, by the at least one processor, text of the plurality of respective emails associated with the at least one respective attendee of each respective meeting to identify the plurality of work task data items identifying the respective plurality of work tasks associated with the at least one respective attendee.

14. The method of clause 11, wherein the attendee location data associated with the at least one respective attendee comprises a real-time location based on tracking an employee badge.

15. The method of clause 11, wherein the attendee location data associated with the at least one respective attendee comprises a real-time location based on global positioning (GPS) data associated with an attendee mobile device.

16. The method of clause 11, further comprising receiving, by the at least one processor, the plurality of respective work task data items from a task scheduling application.

17. The method of clause 11, further comprising determining, by the at least one processor, one or more respective related documents in a cloud storage based at least in part on the plurality of work task data items identifying the respective plurality of work tasks associated with the at least one respective attendee;

wherein the one or more respective related documents are related to the respective plurality of work tasks.

18. The method of clause 17, further comprising:

causing to display, by the at least one processor, a respective reminder indication of a respective unavailability period on a screen of the at least one computing device associated with the at least one respective attendee;

wherein the respective reminder comprises:

i) an attachment for each of the one or more related documents, and ii) the meeting time associated with the respective plurality of work tasks.

19. The method of clause 11, further comprising:

receiving, by the at least one processor, a scheduling response from at least one computing device associated with the at least one respective attendee responsive to a selection by the at least one attendee;

wherein the scheduling response comprising one of:

i) an acceptance, ii) a denial, and iii) a request for a different work location, a different work time, or both;

determining, by the at least one processor, an error associated with the plurality of work parameters based at least in part on the scheduling response; and training, by the at least one processor, the task estimation machine learning model based at least in part on the error.

20. A system comprising:

at least one processor configured to:

receive a plurality of electronic meeting requests to schedule a meeting;

wherein each electronic meeting request comprises an attendee data item identifying at least one respective attendee of each respective meeting;

determine a plurality of work task data items identifying a respective plurality of work tasks associated with the at least one respective attendee;

wherein the plurality of work task data items is stored in at least one task database;

utilize a task estimation machine learning model to predict a plurality of work parameters of at least one meeting task object based at least in part on:

i) the plurality of work task data items, and ii) a work history data identifying work history of the at least one respective attendee;

wherein the at least one meeting task object represents at least one respective work task that the at least one respective attendee would be required to complete prior to the respective meeting;

wherein the plurality of work parameters comprises a task duration parameter representing a predicted time that the at least one respective attendee requires to complete the at least one respective work task associated with each respective meeting;

wherein the work history data comprises:

i) prior work task data items identifying at least one completed respective work task by the at least one respective attendee, and ii) prior task duration data items identifying a time that took the at least one respective attendee to complete the at least one completed respective work task;

utilize a meeting scheduling machine learning model to predict a plurality of parameters of at least one unavailability period object representing an unavailability period required to complete the respective plurality of work tasks based at least in part on the at least one meeting task object, schedule information associated with a respective electronic meeting request and location information associated with the respective electronic meeting request;

wherein the plurality of parameters of at least one meeting room object comprises:

i) an unavailability period location parameter, and ii) an unavailability period time parameter;

wherein the schedule information comprises:

i) an availability data identifying availability of each of the at least one respective attendee associated with the respective plurality of work tasks based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, wherein the meeting history data comprises:

1) cancellation data identifying meeting cancellations, and 2) rescheduling data identifying meeting rescheduling occurrences;

wherein the location information comprises:

i) an attendee location data identifying at least one respective location associated with the at least one respective attendee, ii) available meeting room data identifying all available meeting rooms, and iii) a meeting room location associated with each available meeting room;

cause to display an indication of the at least one unavailability period in response to the at least one electronic meeting request on a screen of at least one computing device associated with the at least one respective attendee based at least in part on the plurality of predicted parameters of the at least one unavailability period object representing the at least one respective unavailability period;

receive a selection of the at least one respective unavailability period from the at least one respective attendee; and dynamically secure the at least one respective unavailability period prior to the at least one respective meeting.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

accessing, by at least one processor, a task completion period object associated with a task of a user;

wherein the task completion period object comprises:

i) at least one task parameter representing at least one work task that the user completed, and ii) a task completion period representing a duration associated with completion of the at least one work task;

receiving, by the at least one processor, a user selection of a response to the task completion period;

calculating, by the at least one processor, based on the user selection, an error associated with the task completion period;

training, by the at least one processor, a task estimation machine learning model backpropagating the error to the task estimation machine learning model to update the task estimation machine learning model and produce a trained task estimation machine learning model trained to predict a plurality of work parameters of the task completion period object based at least in part on:

i) the at least one task parameter, and ii) work history data identifying a work history of the user; and wherein the at least one task parameter comprises a task duration parameter representing a predicted time that the user requires to complete the task; and outputting, by the at least one processor, at least one instruction to at least one calendar software tool to cause the at least one calendar software tool to dynamically secure a corresponding unavailability period calendar object prior to a meeting by automatically book a meeting room at the specified time and location and updating, in real-time, at least one calendar database based at least in part on the task duration parameter.

2. The method of claim 1, further comprising:

receiving, by the at least one processor, an electronic meeting request to schedule at least one subsequent meeting;

wherein the electronic meeting request comprises an attendee data item identifying attendees comprising the attendee;

determining, by the at least one processor, at least one work task data item identifying at least one work task associated with the attendee; and causing to display, by the at least one processor, an indication of at least one subsequent unavailability period calendar object in response to the electronic meeting request on a screen of at least one computing device associated with the attendee.

3. The method of claim 2, wherein the at least one work task data item is stored in at least one task database.

4. The method of claim 1, further comprising training, by the at least one processor, task estimation machine learning model using meeting history data comprising:

cancellation data identifying meeting cancellations, and rescheduling data identifying meeting rescheduling occurrences.

5. The method of claim 1, wherein the work history data comprises:

i) prior work task data items identifying at least one completed work task, and ii) prior task duration data items identifying a time that took the user to complete the at least one completed work task.

6. The method of claim 1, further comprising:

receiving, by the at least one processor, a user selection of a modification to an unavailability period calendar object associated with the unavailability period calendar object;

wherein the modification to the unavailability period calendar object comprises:

a modified unavailability period duration parameter representing a modification to the duration associated with the unavailability period calendar object;

training, by the at least one processor, the task estimation machine learning model to produce the trained task estimation machine learning model to predict the plurality of work parameters of at least one meeting task object based at least in part on a difference between the predicted unavailability period duration parameter and the modified unavailability period duration parameter.

7. The method of claim 1, further comprising:

determining, by the at least one processor, a plurality of emails associated with the user; and parsing, by the at least one processor, text of the plurality of emails to identify the task parameter.

8. The method of claim 1, further comprising receiving, by the at least one processor, the at least one work task of the task parameter from a task scheduling application.

9. The method of claim 1, further comprising determining, by the at least one processor, one or more related documents in a cloud storage based at least in part on the at least one work task of the task parameter.

10. The method of claim 1, further comprising determining, by the at least one processor, an error associated with the task parameter based at least in part on the response;

wherein the user selection of the response comprises at least one of:

i) an acceptance, and ii) a denial; and wherein updating the trained task estimation machine learning model comprises updating the trained task estimation machine learning model based at least in part on the error.

11. A system comprising:

at least one processor in communication with at least one non-transitory computer-readable medium having software instructions stored thereon, wherein the at least one processor is configured, upon execution of the software instructions, to:

access a task completion period object associated with a task of a user;

wherein the task completion period object comprises:

i) at least one task parameter representing at least one work task that the user completed, and ii) a task completion period representing a duration associated with completion of the at least one work task;

receive a user selection of a response to the task completion period;

calculate based on the user selection, an error associated with the task completion period;

train a task estimation machine learning model back-propagating the error to the task estimation machine learning model to update the task estimation machine learning model and produce a trained task estimation machine learning model trained to predict a plurality of work parameters of the task completion period object based at least in part on:

i) the at least one task parameter, and ii) work history data identifying a work history of the user; and wherein the at least one task parameter comprises a task duration parameter representing a predicted time that the user requires to complete the task; and output at least one instruction to at least one calendar software tool to cause the at least one calendar software tool to dynamically secure a corresponding unavailability period calendar object prior to a meeting by automatically book a meeting room at the specified time and location and updating, in real-time, at least one calendar database based at least in part on the task duration parameter.

12. The system of claim 11, wherein the at least one processor further configured to execute software instructions that cause the at least one processor to perform steps to:

receive an electronic meeting request to schedule at least one subsequent meeting;

wherein the electronic meeting request comprises an attendee data item identifying attendees comprising the attendee;

determine at least one work task data item identifying at least one work task associated with the attendee; and causing to display, by the at least one processor, an indication of at least one subsequent unavailability period calendar object in response to the electronic meeting request on a screen of at least one computing device associated with the attendee.

13. The system of claim 12, wherein the at least one work task data item is stored in at least one task database.

14. The system of claim 11, wherein the at least one processor further configured to execute software instructions that cause the at least one processor to perform steps to train task estimation machine learning model using meeting history data comprising:

cancellation data identifying meeting cancellations, and rescheduling data identifying meeting rescheduling occurrences.

15. The system of claim 11, wherein the work history data comprises:

i) prior work task data items identifying at least one completed work task, and ii) prior task duration data items identifying a time that took the user to complete the at least one completed work task.

16. The system of claim 11, wherein the at least one processor further configured to execute software instructions that cause the at least one processor to perform steps to:

receive a user selection of a modification to an unavailability period calendar object associated with the unavailability period calendar object;

wherein the modification to the unavailability period calendar object comprises:

a modified unavailability period duration parameter representing a modification to the duration associated with the unavailability period calendar object;

train the task estimation machine learning model to produce the trained task estimation machine learning model to predict the plurality of work parameters of at least one meeting task object based at least in part on a difference between the predicted unavailability period duration parameter and the modified unavailability period duration parameter.

17. The system of claim 11, wherein the at least one processor further configured to execute software instructions that cause the at least one processor to perform steps to:

determine a plurality of emails associated with the user; and parse text of the plurality of emails to identify the task parameter.

18. The system of claim 11, wherein the at least one processor further configured to execute software instructions that cause the at least one processor to perform steps to receive the at least one work task of the task parameter from a task scheduling application.

19. The system of claim 11, wherein the at least one processor further configured to execute software instructions that cause the at least one processor to perform steps to determine one or more related documents in a cloud storage based at least in part on the at least one work task of the task parameter.

20. The system of claim 11, wherein the at least one processor further configured to execute software instructions that cause the at least one processor to perform steps to determine an error associated with the task parameter based at least in part on the response;

wherein the user selection of the response comprises at least one of:

i) an acceptance, and ii) a denial; and wherein updating the trained task estimation machine learning model comprises updating the trained task estimation machine learning model based at least in part on the error.

* * * * *